(12) United States Patent
Halterman et al.

(10) Patent No.: US 11,669,293 B2
(45) Date of Patent: Jun. 6, 2023

(54) APPARATUS AND METHOD FOR ELECTRONIC LABELING OF ELECTRONIC EQUIPMENT

(71) Applicant: GE INTELLIGENT PLATFORMS, INC., Charlottesville, VA (US)

(72) Inventors: Darrell Lee Halterman, Charlottesville, VA (US); Darrell James Hatfield, Charlottesville, VA (US)

(73) Assignee: INTELLIGENT PLATFORMS, LLC, Charlottesville, VA (US)

(*) Notice: Subject to any disclaimer, the term of this patent is extended or adjusted under 35 U.S.C. 154(b) by 0 days.

(21) Appl. No.: 15/324,748

(22) PCT Filed: Dec. 9, 2014

(86) PCT No.: PCT/US2014/069247
§ 371 (c)(1),
(2) Date: Jan. 9, 2017

(87) PCT Pub. No.: WO2016/007192
PCT Pub. Date: Jan. 14, 2016

(65) Prior Publication Data
US 2017/0206047 A1 Jul. 20, 2017

Related U.S. Application Data

(60) Provisional application No. 62/022,981, filed on Jul. 10, 2014.

(51) Int. Cl.
G06F 3/147 (2006.01)
G09G 3/34 (2006.01)
G05B 19/05 (2006.01)

(52) U.S. Cl.
CPC .......... *G06F 3/147* (2013.01); *G05B 19/056* (2013.01); *G09G 3/344* (2013.01);
(Continued)

(58) Field of Classification Search
None
See application file for complete search history.

(56) References Cited

U.S. PATENT DOCUMENTS 4,099,247 A 7/1978 Mikada et al.
5,900,877 A 5/1999 Weiss et al.
(Continued)

FOREIGN PATENT DOCUMENTS

CN 101251884 A 8/2008
CN 102592524 A 7/2012
(Continued)

OTHER PUBLICATIONS

European Search Report and Opinion issued in connection with related EP Application No. 16168865.0 dated Jul. 12, 2016.
(Continued)

*Primary Examiner* — Ifedayo B Iluyomade
(74) *Attorney, Agent, or Firm* — Marshall, Gerstein & Borun LLP

(57) ABSTRACT

An electronic device is coupled to electronic paper display. The electronic device may be utilized as part of an industrial control system. The central processing unit programmatically and automatically updates the electronic paper display with information to be displayed.

12 Claims, 7 Drawing Sheets

(52) U.S. Cl.
CPC ... *G09G 2370/022* (2013.01); *G09G 2370/06* (2013.01); *G09G 2370/16* (2013.01); *G09G 2370/22* (2013.01); *G09G 2380/04* (2013.01)

(56) References Cited

U.S. PATENT DOCUMENTS

| | | | |
|---|---|---|---|
| 7,062,716 | B2 | 6/2006 | Washington |
| 7,593,000 | B1 | 9/2009 | Chin |
| 8,059,101 | B2 | 11/2011 | Westerman et al. |
| 8,125,312 | B2 | 2/2012 | Orr |
| 8,255,867 | B1 | 8/2012 | Chaplin et al. |
| 8,286,102 | B1 | 10/2012 | Wilensky |
| 8,405,616 | B2 | 3/2013 | Jung et al. |
| 8,445,793 | B2 | 5/2013 | Westerman et al. |
| 8,458,485 | B2 | 6/2013 | Bandyopadhyay et al. |
| 8,525,799 | B1 | 9/2013 | Grivna et al. |
| 8,536,978 | B2 | 9/2013 | Coggill |
| 8,619,052 | B2 | 12/2013 | Benko et al. |
| 8,638,939 | B1 | 1/2014 | Casey et al. |
| 8,686,958 | B2 | 4/2014 | Rutledge et al. |
| 8,823,642 | B2 | 9/2014 | Valik et al. |
| 8,824,040 | B1 | 9/2014 | Buchheit et al. |
| 8,830,072 | B2 | 9/2014 | Batra et al. |
| 9,001,061 | B2 | 4/2015 | Locker et al. |
| 9,030,418 | B2 | 5/2015 | Ku et al. |
| 9,165,159 | B1 | 10/2015 | McDonnell |
| 9,189,614 | B2 | 11/2015 | DeLuca |
| 9,262,603 | B2 | 2/2016 | Dow et al. |
| 9,357,391 | B1 | 5/2016 | Alsvig et al. |
| 9,460,575 | B2 | 10/2016 | Park et al. |
| 9,600,103 | B1 | 3/2017 | Eischeid et al. |
| 9,703,392 | B2 | 7/2017 | Wakabayashi |
| 9,983,664 | B2 | 5/2018 | Kim et al. |
| 2002/0054120 | A1 | 5/2002 | Kawano et al. |
| 2002/0109677 | A1 | 8/2002 | Taylor |
| 2002/0140688 | A1 | 10/2002 | Steinberg et al. |
| 2002/0167500 | A1 | 11/2002 | Gelbman |
| 2004/0003036 | A1 | 1/2004 | Eagle et al. |
| 2004/0156170 | A1 | 8/2004 | Mager et al. |
| 2006/0284852 | A1 | 12/2006 | Hofmeister et al. |
| 2007/0024551 | A1* | 2/2007 | Gelbman ......... G06K 19/07758 345/85 |
| 2007/0177803 | A1 | 8/2007 | Elias et al. |
| 2007/0285385 | A1 | 12/2007 | Albert et al. |
| 2008/0136587 | A1 | 6/2008 | Orr |
| 2008/0303637 | A1 | 12/2008 | Gelbman et al. |
| 2009/0051648 | A1 | 2/2009 | Shamaie et al. |
| 2009/0089701 | A1 | 4/2009 | Baier et al. |
| 2009/0122018 | A1 | 5/2009 | Vymenets et al. |
| 2009/0135147 | A1 | 5/2009 | Hsu et al. |
| 2009/0195496 | A1 | 8/2009 | Koyama et al. |
| 2009/0225023 | A1 | 9/2009 | Szolyga et al. |
| 2009/0262379 | A1 | 10/2009 | Miyake et al. |
| 2009/0278807 | A1 | 11/2009 | Hu |
| 2009/0322700 | A1 | 12/2009 | D'Souza et al. |
| 2010/0020025 | A1 | 1/2010 | Lemort et al. |
| 2010/0031200 | A1 | 2/2010 | Chen |
| 2010/0031344 | A1 | 2/2010 | Zhao et al. |
| 2010/0073303 | A1 | 3/2010 | Wu et al. |
| 2010/0115473 | A1 | 5/2010 | Reeves et al. |
| 2010/0138764 | A1 | 6/2010 | Hatambeiki et al. |
| 2010/0162182 | A1 | 6/2010 | Oh et al. |
| 2010/0177660 | A1* | 7/2010 | Essinger ............... H04W 4/50 370/254 |
| 2010/0194702 | A1 | 8/2010 | Chen |
| 2010/0245102 | A1 | 9/2010 | Yokoi |
| 2010/0245341 | A1 | 9/2010 | Tanaka |
| 2010/0322485 | A1 | 12/2010 | Riddiford |
| 2011/0041102 | A1 | 2/2011 | Kim |
| 2011/0069018 | A1 | 3/2011 | Atkins et al. |
| 2011/0078568 | A1 | 3/2011 | Park et al. |
| 2011/0118694 | A1* | 5/2011 | Yodfat ................ A61M 5/172 604/93.01 |
| 2011/0156867 | A1 | 6/2011 | Carrizo et al. |
| 2011/0157375 | A1 | 6/2011 | Kusumoto |
| 2011/0175839 | A1 | 7/2011 | Prabhu |
| 2011/0242022 | A1 | 10/2011 | Wen |
| 2011/0260829 | A1 | 10/2011 | Lee |
| 2011/0273388 | A1 | 11/2011 | Joo et al. |
| 2011/0285645 | A1 | 11/2011 | Cho et al. |
| 2011/0320978 | A1 | 12/2011 | Horodezky et al. |
| 2012/0023574 | A1 | 1/2012 | Osborn et al. |
| 2012/0066650 | A1 | 3/2012 | Tirpak et al. |
| 2012/0184368 | A1 | 7/2012 | Yamaoka |
| 2012/0206474 | A1 | 8/2012 | Holland et al. |
| 2012/0256863 | A1 | 10/2012 | Zhang et al. |
| 2012/0291120 | A1 | 11/2012 | Griffin |
| 2012/0306793 | A1 | 12/2012 | Liu et al. |
| 2013/0033436 | A1 | 2/2013 | Brinda et al. |
| 2013/0057070 | A1 | 3/2013 | Onishi et al. |
| 2013/0104065 | A1 | 4/2013 | Stecher |
| 2013/0135178 | A1 | 5/2013 | Miyahara |
| 2013/0227496 | A1 | 8/2013 | Maekawa |
| 2013/0241844 | A1 | 9/2013 | Chang |
| 2013/0268900 | A1 | 10/2013 | Ferren et al. |
| 2013/0298071 | A1 | 11/2013 | Wine |
| 2014/0026055 | A1 | 1/2014 | Cohn et al. |
| 2014/0035853 | A1 | 2/2014 | Ok et al. |
| 2014/0092031 | A1 | 4/2014 | Schwartz et al. |
| 2014/0109018 | A1 | 4/2014 | Casey et al. |
| 2014/0123080 | A1 | 5/2014 | Gan |
| 2014/0143859 | A1 | 5/2014 | Linge et al. |
| 2014/0173529 | A1 | 6/2014 | Hicks |
| 2014/0189855 | A1 | 7/2014 | Moradi et al. |
| 2014/0223381 | A1 | 8/2014 | Huang et al. |
| 2014/0223549 | A1 | 8/2014 | Quintanilla |
| 2014/0245203 | A1 | 8/2014 | Lee et al. |
| 2014/0267015 | A1 | 9/2014 | Saatchi et al. |
| 2014/0277753 | A1 | 9/2014 | Eiynk et al. |
| 2014/0298237 | A1 | 10/2014 | Galu, Jr. |
| 2014/0372896 | A1 | 12/2014 | Raman |
| 2015/0007308 | A1 | 1/2015 | Mankowski |
| 2015/0029095 | A1 | 1/2015 | Gomez et al. |
| 2015/0038072 | A1 | 2/2015 | Cordier et al. |
| 2015/0046885 | A1 | 2/2015 | Zhang et al. |
| 2015/0067578 | A1 | 3/2015 | Ryu et al. |
| 2015/0072784 | A1 | 3/2015 | Lee |
| 2015/0121314 | A1 | 4/2015 | Bombolowsky |
| 2015/0135129 | A1 | 5/2015 | Kwon et al. |
| 2015/0138142 | A1 | 5/2015 | Liao et al. |
| 2015/0153932 | A1 | 6/2015 | Jiang et al. |
| 2015/0169141 | A1 | 6/2015 | Kim et al. |
| 2015/0169216 | A1 | 6/2015 | Cho |
| 2015/0169502 | A1 | 6/2015 | Koenig et al. |
| 2015/0188970 | A1 | 7/2015 | Kowshik et al. |
| 2015/0220182 | A1 | 8/2015 | Avrahami |
| 2015/0294096 | A1 | 10/2015 | Grigg et al. |
| 2015/0355805 | A1 | 12/2015 | Chandler et al. |
| 2015/0365492 | A1 | 12/2015 | Kalan et al. |
| 2016/0054851 | A1 | 2/2016 | Kim et al. |
| 2017/0039691 | A1 | 2/2017 | Sugioka |
| 2017/0230378 | A1 | 8/2017 | Bliss |
| 2018/0267690 | A1 | 9/2018 | Kemp et al. |
| 2019/0095075 | A1 | 3/2019 | Yang |
| 2019/0174069 | A1 | 6/2019 | Poindexter, Jr. |

FOREIGN PATENT DOCUMENTS

| | | |
|---|---|---|
| CN | 203204640 U | 9/2013 |
| EP | 2 416 308 A1 | 2/2012 |
| EP | 2416308 A1 | 2/2012 |
| EP | 2042955 A1 | 4/2016 |
| WO | 9721204 A1 | 6/1997 |
| WO | WO-2015/012789 A1 | 1/2015 |

OTHER PUBLICATIONS

U.S. Non-Final Office Action issued in connection with related U.S. Appl. No. 14/713,467 dated Oct. 4, 2016.
European Search Report and Opinion issued in connection with related EP Application No. 16168865.0 dated Oct. 17, 2016.
U.S. Final Office Action issued in connection with related U.S. Appl. No. 14/713,467 dated Apr. 19, 2017.

(56) References Cited

OTHER PUBLICATIONS

Machine Translation and First Office Action and Search issued in connection with corresponding CN Application No. 201480080514.0 dated Jun. 29, 2018.
Third Office Action for Chinese Application No. 201480080514.0, dated Apr. 12, 2019.
Copending U.S. Appl. No. 15/145,073, filed May 3, 2016, and the prosecution history thereof.
Copending U.S. Appl. No. 15/145,087, filed May 3, 2016, and the prosecution history thereof.
Copending U.S. Appl. No. 15/145,095, filed May 3, 2016, and the prosecution history thereof.
International Preliminary Report on Patentability for Application No. PCT/US2014/069247, dated Jan. 10, 2017.
International Search Report and Written Opinion for Application No. PCT/US2014/069247, dated Jun. 23, 2015.
Jiao, et al., "An Investigation of Two-Handled Manipulation and Related Techniques in Multi-touch Interaction", Machine Vision and Human-Machine Interface (MVHI), 2010, 565-568.
Lee, et al., "Access to an Automated Security System Using Gesture-Based Passwords", Network-Based Information Systems (NBiS), 2012 15 International Conference, 2012, 760-765.
Niu, Yuan et al., "Gesture Authentication with Touch Input for Mobile Devices," Third International ICST Conference, MobiSec 2011, Aalborg, Denmark, May 17-19, 2011, pp. 13-24.
Office Action, European patent application No. 14824987.3, dated Jul. 9, 2019.
Sae-Bae, et al., "Multitouch Gesture-Based Authentication", Information Forensics and Security, IEEE Transactions, 2014, 568-582.
Tsagaris, et al., "Methodology for finger gesture control of mechatronic systems", Mechatronika, 2012, 1-6.
Wang, et al., "VirtualTouch: A finger glove to simulate touch screen commands", Sensors, 2012 IEEE, 2012, 1-4.
Decision on Rejection for Chinese Application No. 201480080514.0, dated Sep. 30, 2019.

* cited by examiner

APPARATUS AND METHOD FOR ELECTRONIC LABELING OF ELECTRONIC EQUIPMENT

CROSS REFERENCE TO RELATED APPLICATIONS

This application claims the benefit under 35 U.S.C. § 119 (e) to U.S. Provisional Application No. 62/022,981 entitled APPARATUS AND METHOD FOR ELECTRONIC LABELING OF ELECTRONIC EQUIPMENT, filed Jul. 10, 2014, the content of which is incorporated herein by reference in its entirety.

BACKGROUND OF THE INVENTION

Field of the Invention

The subject matter disclosed herein generally relates to the identification of electronic equipment and the labeling of this equipment.

Brief Description of the Related Art

Today, electronically programmable devices having configurable parameters have paper labels that are used to display configuration or registration information to a user. The labels may identify various types of other information related to these devices as well.

The labels must either be printed by machine or by hand, and then attached to the product or device. This process is labor-intensive and is prone to errors or falling out of date if the device is updated. Alternately, an active display such as a liquid crystal display (LCD) display or a light emitting diode (LED) array can be provided to display this information. However, these methods require additional energy to keep the information visible and are not available if the product is powered off.

These shortcomings have resulted in some user dissatisfaction with previous approaches.

BRIEF DESCRIPTION OF THE INVENTION

Programmable labeling is provided that eliminates or substantially reduces the problems associated with paper labels or LCD/LED displays. In one aspect, a display, screen, or label is provided (utilizing electronic paper that employs e-ink to create images). In some examples, the screen, display, or label has an appearance similar to that of a paper label (with color or black and white printing). Through an electronic interface, the screen, display, or label is updated programmatically and/or automatically. It will be appreciated that the terms "screen," "display," "electronic paper display," and "label" are used interchangeably herein. This screen could hold a static image or text without any required electricity to maintain the image. The screens provided herein have the benefit of being configurable, but not requiring additional power and being available even if the electronic module to which the screen is coupled is powered down.

In another advantage, programmable labeling for electronic devices could replace both static labels and LCD/LED displays for conveying configuration, registration, user interface, user interaction, or status information for programmable or pre-programmed electronic devices. Dynamic updates could be provided and as mentioned, once made, would require no power or maintenance to continue to display values. The present approaches are particularly useful and advantageous for devices where components of the device might be configured for multiple purposes that are not obvious by their physical interfaces.

One example of a device that might utilize programmable labels is an industrial automation input/output module that has one or more data channels that can be configured to receive discrete or analog inputs or send discrete or analog outputs of a variety of types. The labels for each channel could be updated to indicate the configured for the purpose for each channel along with its status and user-defined value.

Further applications of the present approaches include speeding mass-production of fixed-function input/output (IO) and/or communications modules. The present approaches could additionally be used to display configuration and identification (ID) settings for universal IO and/or communications modules, and facilitate and provide universal replacement spare parts. The present approaches provide customized maintenance or replacement instructions, even when the module is powered down or damaged. The present approaches also provide language localization advantages. For example, labels can be created on-the-fly using any desired language (e.g., English, Chinese, Japanese, German, or French to mention a few examples).

The interface between an electronic device and the programmable labeling could either be through a physical connection or through a wireless connection. In one aspect, programmable labeling would have to have an identification mechanism or unique ID to allow pairing to occur between the electronic device and the programmable label to avoid accidental programming by other neighboring or nearby electronic devices. That is, a label (having a unique ID) could only be re-programmed when a change request invoked the label's unique ID so that the label knew that it should be re-programmed with incoming information. Also, the label could detect a mis-pairing and notify the user that it was installed with the wrong electronic device, mitigating potential damage due to IO improperly connected to the wrong electronic device.

Additional connectivity could be avoided by incorporating an energy-harvesting technology to power the display. To avoid delays at power-up or during configuration cycles, the programmable label could maintain a check-sum or other unique present-configuration ID that could be compared before updating the programmable label. In the event that a programmable label update failed, the programmable label could be configured to either return to its last-good image and text display, or could revert to a default display that would indicate the failure and necessary steps to recover.

By allowing label data to be programmed, much faster mass-production of similar products with configurable capabilities is achieved by allowing a final programming or configuration operation to also label the product without human intervention and without inventory of labels or high-speed printing equipment.

BRIEF DESCRIPTION OF THE DRAWINGS

For a more complete understanding of the disclosure, reference should be made to e following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

The present approaches allow for seamless localization of products into any language based solely on configuration. Additionally, the present approaches allow universal IO and universal communications modules to have clear, accurate identification and interface labeling without any extra user intervention. Unlike LCD or active displays, the present approaches require no power to maintain the display. The display is visible when the electronic device is unpowered or even damaged. The present approaches advantageously allow universal replacement parts that assume the identities and display configurations of other universal modules or even fixed modules for which a universal module is a valid substitute. As mentioned, the present approaches also allow for user-defined labels and names to appear without any extra user intervention, but unlike LCD or active displays, require no power to maintain the display and is visible when the electronic device is unpowered or even damaged. The present approaches provide customized maintenance or replacement instructions, even when the module is powered down or damaged.

Advantageously, the present approaches provide up-to-date links to user documentation and/or product technical support on the product itself. The present approaches also greatly simplify equipment labeling or updating for system Integrators or end users. The present approaches additionally allow for common components to be produced at different price points with different configured capabilities and provide streamlined and efficient user interface and documentation of universal IO or universal communications modules. The present approaches allow for specific maintenance or replacement data to be displayed on the device without the device being powered up.

Figure 1:
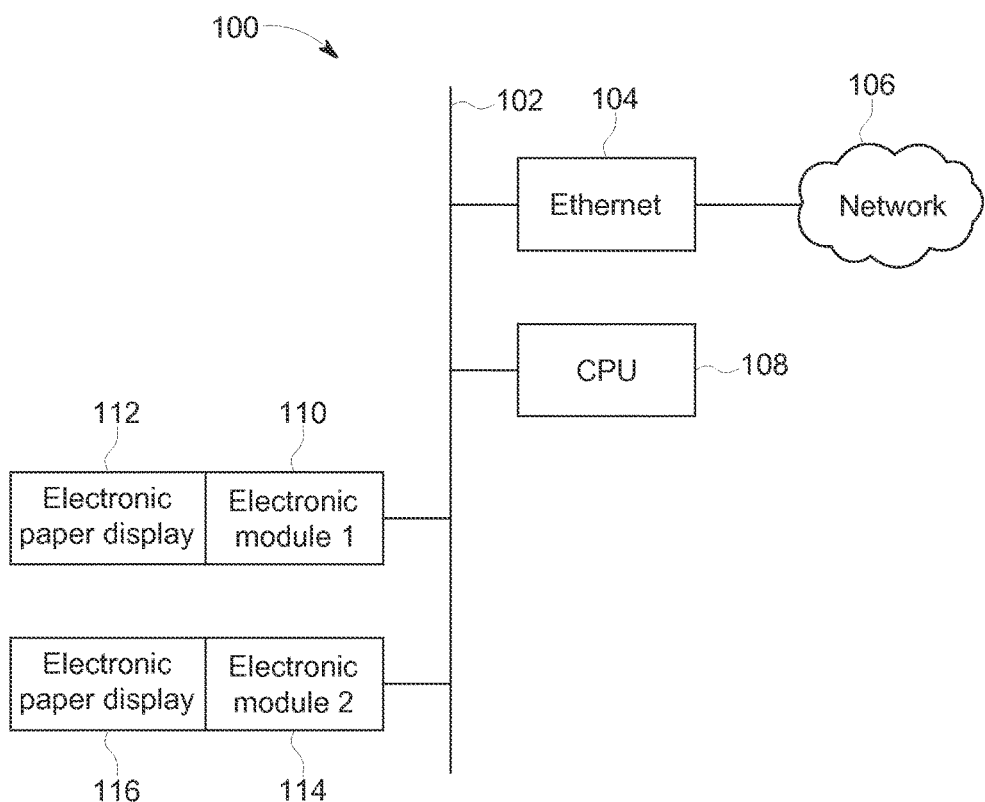
FIG. 1 comprises a block diagram of a system with an electronic paper device having an electronic display using e-ink according to various embodiments of the present invention.

Referring now to FIG. 1, one example of a system 100 that uses electronic labeling is described. The system includes an electronic back plane 102. Coupled to the back plane 102 are a network module 104 (coupled to a network 106), a central processing unit (CPU) 108, a first electronic module 110 (coupled to a first electronic paper display 112) and a second electronic module 114 (coupled to a second electronic paper display 116).

The electronic back plane 102 is an electrical communication path between different system elements. The electronic back plane 102 provides an electrical connection between these elements.

The network module 104 provides connection functionality to one or more communication networks. For example, the network module 104 may be an Ethernet module or provide connections to the Internet.

The network 106 may be any network or any combination of networks. For example, it may be the Internet, Ethernet, a cellular network, a local area network or any combination of these networks.

The central processing unit (CPU) 108 provides supervisory and processing functions for the system. The CPU 108 may determine when and how to download information to the first electronic paper display 112 and the second electronic paper display 116.

The first electronic module 110 and the second electronic module 114 are electronic modules that provide various control system functionalities. They may include switches or implement various processing functions of any type. They may include a local process that receives information from the CPU 108. The modules 110 and 114 may be universal IO or communication modules.

The first electronic paper display 112 and the second electronic paper display 116 are coupled to the first electronic module 110 and the second electronic module 114. The first electronic paper display 112 and the second electronic paper display 116 are displays that use e-ink to render displays of information to users. For example, configuration and ID information for particular ones of the modules 110 and 114 may be displayed. The first electronic paper display 112 and the second electronic paper display 116 may be organized as matrices and receive commands that are decoded to render the information to the user in e-ink.

In one example of the operation of the system of FIG. 1, the CPU 108 is programmed with information concerning labels. This information may be organized according to customers or equipment type or configuration, and will be presented on the first electronic paper display 112 and the second electronic paper display 116. The information is downloaded to the first electronic module 110 or the second electronic module 114. The information is transmitted from the first electronic module 110 to the first electronic paper display 112 and from the second electronic module 114 to the second electronic paper display 116. The information is rendered on the displays.

In one example, input/output (IO) modules typically contain 1-32 or more channels of IO that perform the same function with limited individual functional configuration (e.g., high-low ranges, set points, scaling, and so forth). Universal IO modules are capable of configuring individual IO channels to be any type of IO from an analog input, analog output, discrete input, or discrete output. Individual channels could also be configured to accept a range of connections such as 5 VDC discrete input or output, 24 VDC discrete input or output, 4-20 mA current analog input or output, RTD analog input, −10VDC-+10VDC analog output or input, and so forth. It will be appreciated that these are examples only and that other examples are possible.

The first electronic paper display 112 and the second electronic paper display 116 allow the customer to automatically and dynamically display accurately the exact configuration for each IO channel, along with its user-defined logical ID. For example, a wiring diagram for a universal IO module (e.g., one of the modules 110 or 114) would also be automatically updated at a label to reflect the user's specifications of each IO Channel. In another example, a two-dimensional (2D) matrix barcode at the label could be updated to point to appropriately tailored user documentation or program information. If maintenance required a change in the definition of either the function of a particular channel or its user-defined, logical ID, these changes would be reflected automatically with no additional user intervention.

Communications modules (e.g., one of the modules 110 or 114) sometimes have a variety of user-defined logical device names and be configured for a variety of protocols over their physical media. These universal communications modules could be programmed for any variety of protocol support, which would be reflected on appropriate displays of the first electronic paper display 112 and the second electronic paper display 116.

Another use of the universal IO module with the first electronic paper display 112 and the second electronic paper display 116 would be to provide a universal spare IO module. Users could purchase IO modules with fixed IO channel values of a variety of discrete and analog types, but then purchase a single type of universal IO as spare modules. When a fixed IO channel module failed, it could be replaced with a universal IO module of suitable configurability which would automatically assume the configuration of the fixed IO channel module it replaced and update its programmable labeling to even identify itself as the module it replaced and indicate it was configured and operating as the module it replaced. This approach would avoid confusion about replacement modules and drastically simplify maintenance. If the module was not a suitable substitute for the module the user attempted to replace, the first electronic paper display 112 and the second electronic paper display 116 could clearly and immediately indicate the incompatibility and either explicitly recommend a suitable substitute or update its display (e.g., via a 2D matrix barcode) to provide a link to documentation on suitable substitutes or even a contact number or a URL for customer support.

In the event of a failure of a fixed communications or universal communications module, the universal communications module assumes the identity and configuration of a failed fixed-communications module and updates its labels to identify itself as the failed module it replaces, and shows the configuration information of the fixed communications module it replaced, including additional information like supported protocols. Again, if the module was not a suitable substitute for the module the user attempted to replace, the first electronic paper display 112 and the second electronic paper display 116 could clearly and immediately indicate the incompatibility and either explicitly recommend a suitable substitute or update (e.g., via 2D matrix barcode) to provide a link to documentation on suitable substitutes or even a contact number or URL for customer support.

In both the cases of IO and Communications modules, the first electronic paper display 112 and the second electronic paper display 116 could be used to display user-maintenance steps or instructions in the event of a failure or an event requiring user intervention or maintenance.

Another use for the programmable labeling is language localization for modules located in different geographic regions. For example, the first electronic paper display 112 and the second electronic paper display 116 could be programmed to render its displays in Chinese if in China, or render its displays in English if the module were located in an English-speaking country or region.

As mentioned, the interface between the electronic modules 110 and 114 and the electronic paper displays 112 and 116 could either be through a physical connection or through a wireless connection. Possible physical connections could be an I2C or SPI interface. Possible wireless connections could be through a low-power, directed transmitter and receiver configurations using protocols like Bluetooth, Zigbee, Wi-Fi or other wireless communications protocols. Other examples are possible.

The first electronic paper display 112 and the second electronic paper display 116 may have an identification mechanism or unique ID to allow for pairing between electronic device and programmable label to avoid accidental programming by other neighboring or nearby electronic devices. That is, the first electronic paper display 112 and the second electronic paper display 116 (each having unique IDs) could only be re-programmed when a change request invoked the unique ID so that the label knew that it should be re-programmed with incoming information. This pairing mechanism could also be used to indicate on the electronic paper display information regarding incorrect mating of a terminal block (containing the electronic paper label) with an incorrect electronic device.

In the event that the first electronic paper display 112 and the second electronic paper display 116 were paired through a wireless medium, additional connectivity could be avoided by incorporating an energy-harvesting technology to power the display for the short intervals required for updates. Examples of energy-harvesting technologies could be thermocouple power harvesting, piezoelectric power harvesting, magnetic induction harvesting, or some other form of power harvesting technology. Also, capacitive coupling power harvesting could be used in another example.

To avoid delays at power-up or during configuration cycles, the first electronic paper display 112 and the second electronic paper display 116 could maintain a check-sum or other unique present-configuration ID that could be compared before updating the programmable label. When the module power up or an configuration update is applied, if it does not change the information conveyed by the first electronic paper display 112 and the second electronic paper display 116, then the update could be skipped as it would result in no difference in display at the first electronic paper display 112 and the second electronic paper display 116.

In the event that a programmable label update failed, the first electronic paper display 112 and the second electronic paper display 116 could be configured to either return to its last-good image and text display, or could revert to a default display that would indicate the failure and necessary steps to recover.

Figure 2:
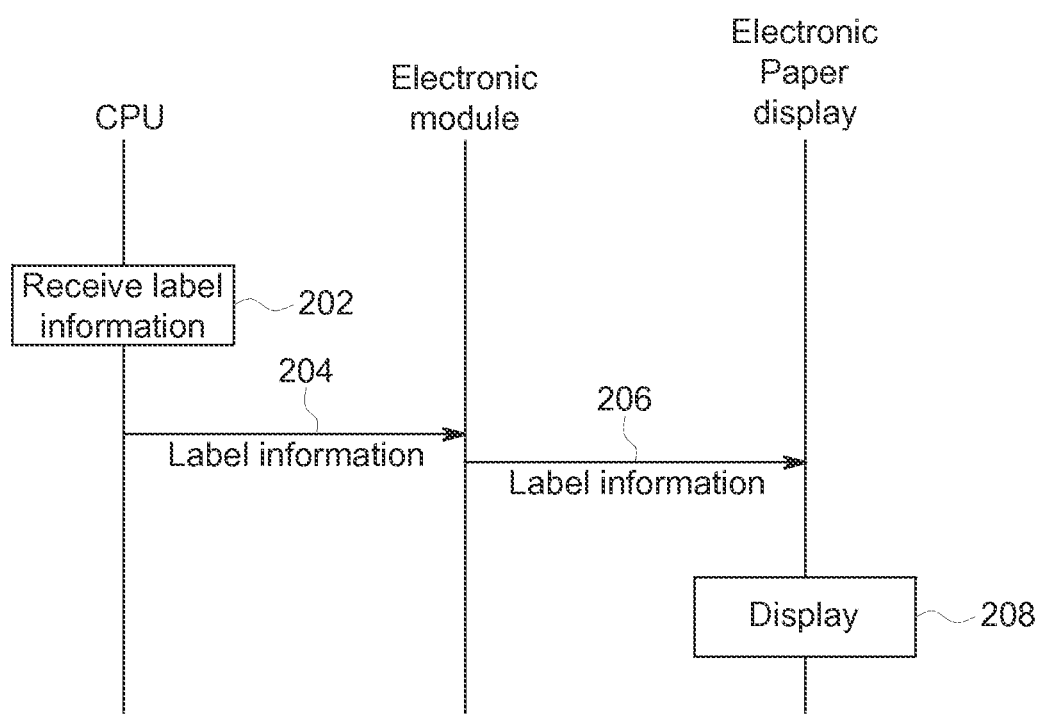
FIG. 2 comprises a flow chart of programming an electronic paper display using e-ink according to various embodiments of the present invention.

Referring now to FIG. 2, one example of transmitting information to the label is described. At step 202, label information is received at the CPU. At this step, the CPU may be programmed with certain label information for various electronic devices. For instance, certain customers may have certain information to be displayed and arranged in certain ways.

At step 204, this label information is sent to the electronic module. At step 206, the information is sent from the electronic module to the electronic paper display. This may be accomplished wirelessly or across a wired connection. At step 208, the electronic display renders or displays the information on the label.

Figure 3:
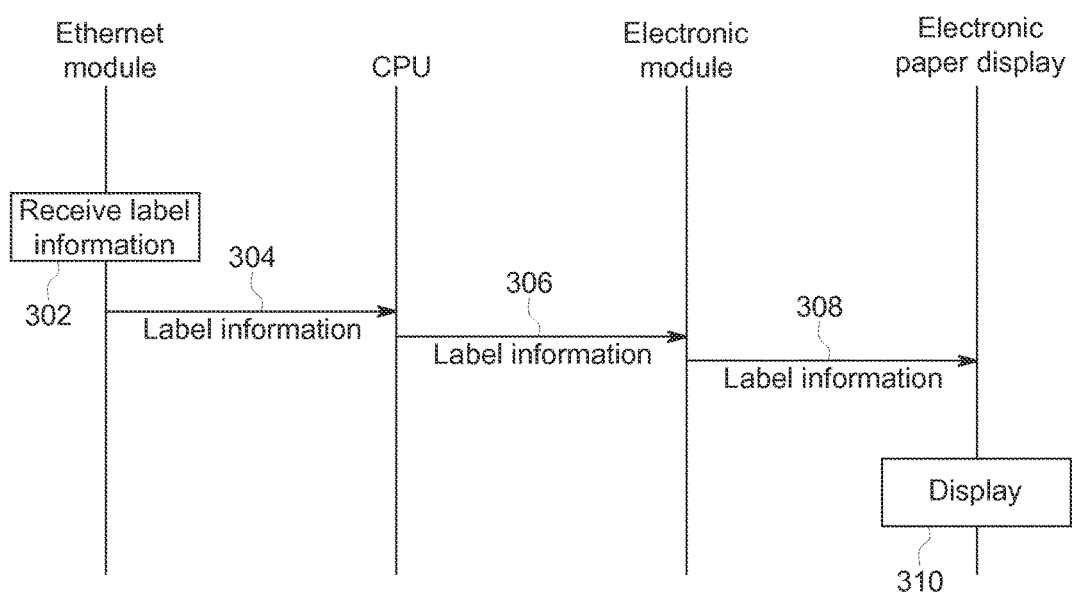
FIG. 3 comprises a flow chart of programming an electronic paper display using e-ink according to various embodiments of the present invention.

Referring now to FIG. 3, another example of transmitting information to the label is described. At step 302, label information is received at the network module. The label information may originate from the Internet or some other network. Consequently, an outside user may program or enter the label information on-the-fly from any remote terminal at any location that is connected to a network.

At step 304, this label information is transmitted to the CPU. At step 306, this label information is sent to the electronic module. At step 308, it is sent to the electronic paper display. This may be accomplished wirelessly or across a wired connection. At step 310, the electronic display renders or displays the information on the label.

Figure 4:
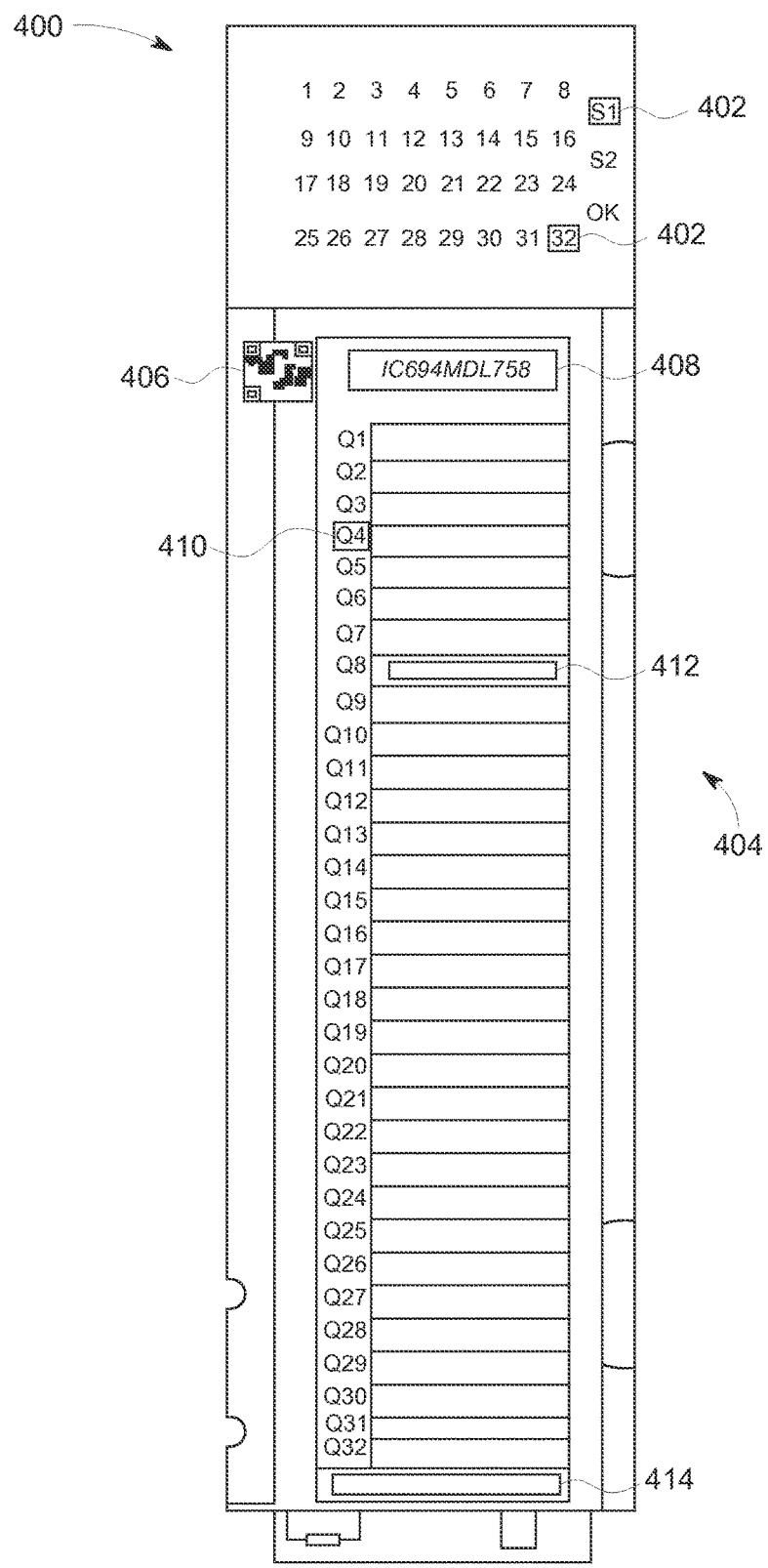
FIG. 4 comprises a diagram of an electronic device with an electronic paper display using e-ink according to various embodiments of the present invention.
Figure 5:
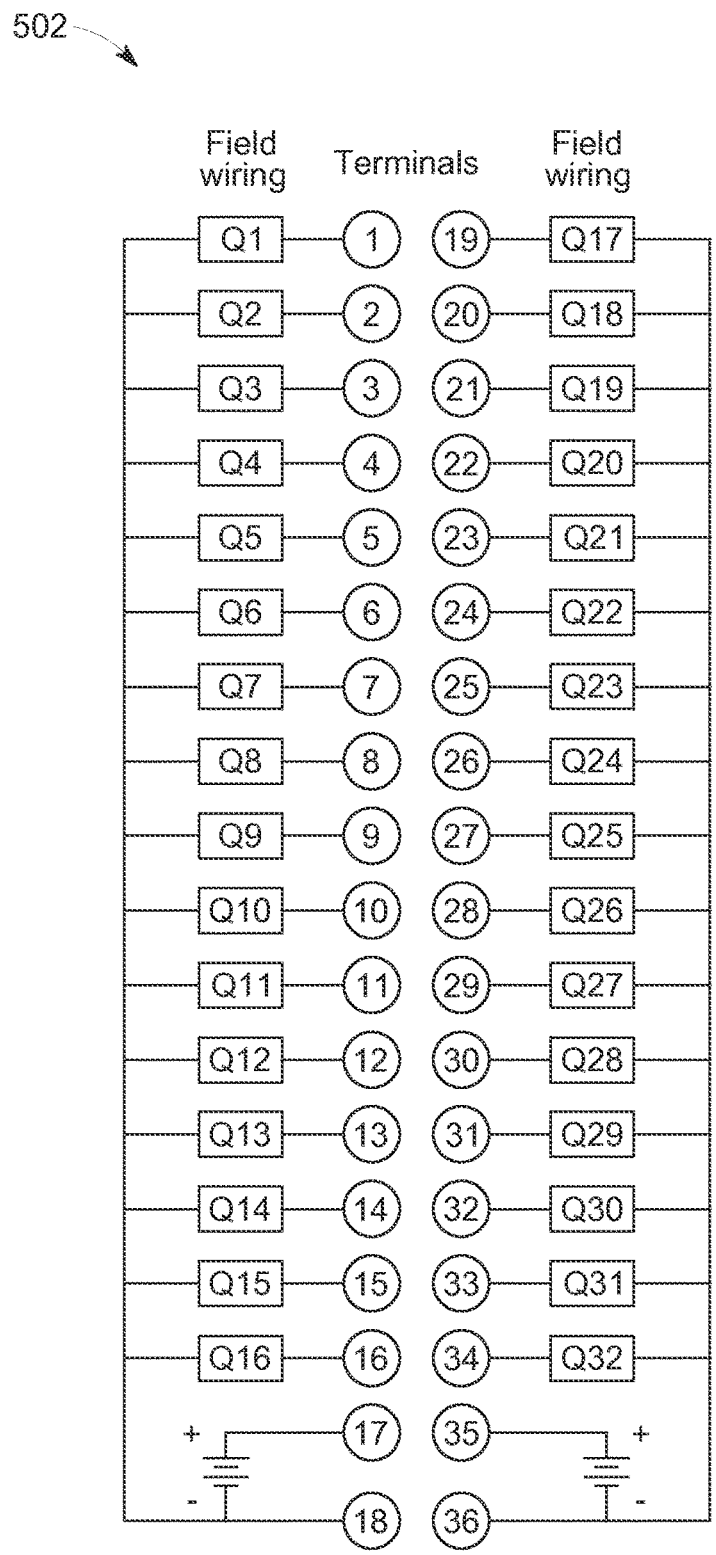
FIG. 5 comprises a diagram of an electronic device with an electronic paper display using e-ink according to various embodiments of the present invention.
Figure 6:
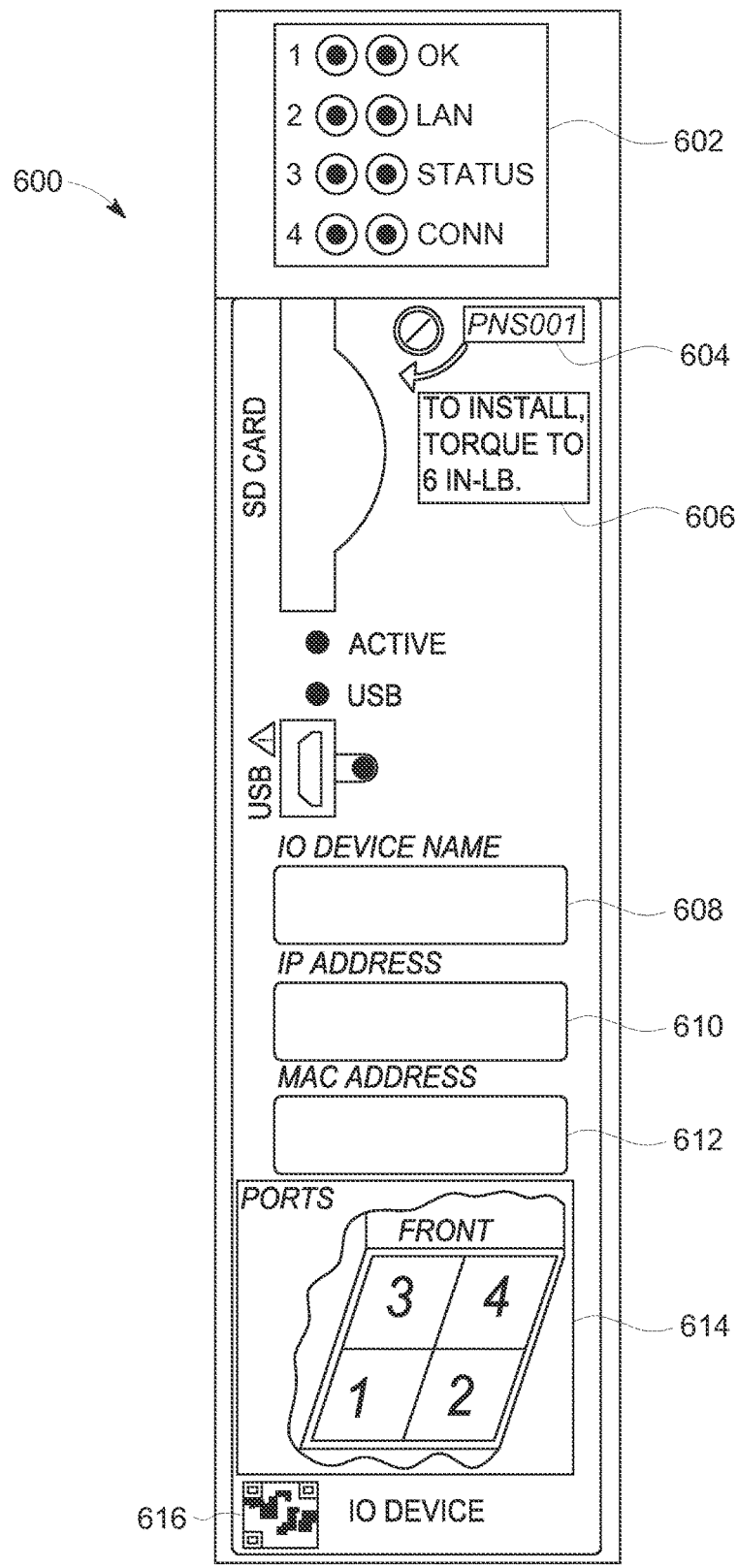
FIG. 6 comprises a diagram of an electronic device with an electronic paper display using e-ink according to various embodiments of the present invention.

FIG. 4, FIG. 5, and FIG. 6 are examples of IO and communications modules with programmable labeling are utilized. It will be appreciated that these are examples only and that the specific function of the electronic device using programmable labeling is limitless. For example programmable logic controllers (PLCs), a distributed control system (DCS), computers or industrial computers, networking equipment, sensors or other interface devices, can utilize these approaches.

FIG. 4 represents the front cover of an IO module 400 with, in this example, 32 channels with module identification and status information, a channel configured function and channel number indicator, as well as a section for User-defined Channel Logical IDs. The module 400 includes a light emitting diode (LED) area 402 (with LEDs indicating health status indicators and channel status indicators) and an electronic paper display (or label) 404. The electronic paper display 404 may be a single screen or display area, or multiple screens or display areas. The label 404 includes a 2D matrix barcode 406, a module model number 408, a channel configured function and number 410, a user-defined channel logic ID 412, and a module color code function indicator 414.

All or some of these items might change and be an electronic paper display rendered in e-ink. For example, The 2D Matrix or International (or European) Article Number (EAN) barcode 406 is an electronic paper display that in one aspect provides a link (e.g., via smart phone) to the latest user manuals and detailed configuration settings for the IO module 400, which could be updated by the system controller connected to the Internet when module configuration or user manual updates are made. Also, user-defined information like user-defined channel logical ID 412 is an electronic paper display that is automatically populated or updated when the user-defined configuration for the module was updated programmatically.

FIG. 5 is a wiring diagram 502 that ships with the IO module to show the customer proper wiring for the IO module channels and is located on the inside of the front cover. This might be changed over time. The entire wiring diagram or portions of it may be an electronic paper display.

FIG. 6 is a communications module 600 with module identification and status information, as well as configurable network addressing information. The module 600 includes a module/port status area 602, a module model number 604, module installation information 606, user defined logical device name 608, a network logic address 610, a network physical address 612, a port configuration 614, and a 2D matrix/barcode 616.

Some of these fields may change and may be electronic paper displays. The 2D Matrix or EAN barcode 616 is an electronic paper display that provides a link (e.g., via smart phone or tablet) to the latest user manuals and detailed configuration settings for the communications module 600, which could be updated by the system controller connected to the Internet when module configuration or user manual updates are made. Also, the user-defined logical device name 608 is an electronic paper display that is automatically populated or updated when the user-defined configuration for the module was updated programmatically.

As shown in FIG. 4, FIG. 5, and FIG. 6, programmable labeling could allow for user-defined items to be updated upon configuration of the fixed-function module. In addition, module firmware revisions or other upgradeable revision information could be updated. Further, a base module could receive a fixed program during manufacturing that would turn it into a fixed-function IO or communications module that could be displayed on the programmable label. This eliminates the need for carrying multiple labels in a manufacturing setting thus speeding and allowing for more flexibility in the module manufacturing process.

Figure 7:
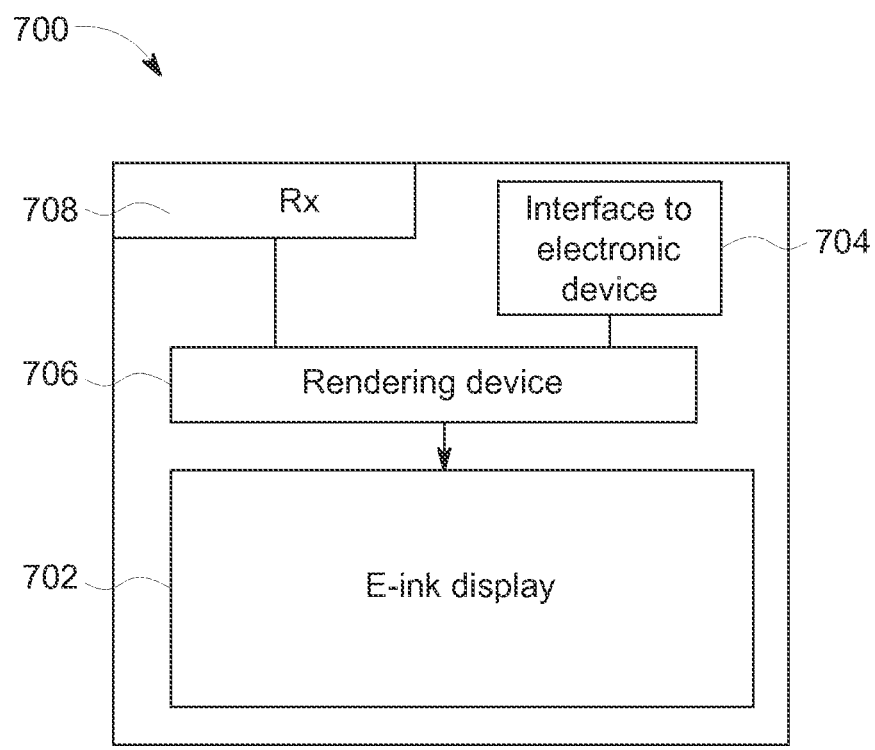
FIG. 7 comprises a diagram of an electronic paper display using e-ink according to various embodiments of the present invention.

Referring now to FIG. 7, one example of an electronic paper display 700 is described. The display 700 includes an e-ink display area 702, an interface to an electronic device (or module) 704, a rendering device 706, and a receiver 708. The receiver 708 receives label information. This information is passed to the rendering device 704, which translates this into a display on e-ink on the e-ink display area 702. The e-ink display area 702 may be a single screen/display area or divided into separate, smaller screens/display areas of any shape or size. In one example, the displays may be made in black-and-white, but color displays may also be made.

Alternatively, a wired connection to an electronic device (or module) may couple to the interface 704. This information is passed to the rendering device 704, which translates this into a display on e-ink on the e-ink display 702. Consequently, the electronic paper display 700 may receive information over a wire, wirelessly, or in both manners.

It will be appreciated by those skilled in the art that modifications to the foregoing embodiments may be made in various aspects. Other variations clearly would also work, and are within the scope and spirit of the invention. It is deemed that the spirit and scope of that invention encompasses such modifications and alterations to the embodiments herein as would be apparent to one of ordinary skill in the art and familiar with the teachings of the present application.

What is claimed is:

1. A method, comprising:
receiving, by an industrial automation input/output (I/O) module having a plurality of data channels each having a respective type of analog input (AI), analog output (AO), discrete input (DI), or discrete output (DO), a request that includes electronic label information for reprogramming a label paired to the industrial automation I/O module to identify one or more of the plurality of data channels of the industrial automation I/O module, wherein the label is identified by a first ID, wherein the request has a second ID, wherein the electronic label information includes configuration information representative of a configuration of the industrial automation I/O module, and wherein the label is configurable and capable of displaying an image or text without any power required to maintain the image or text;
transmitting, by the industrial automation I/O module, the electronic label information to the label wirelessly or across a wired connection;
when the second ID matches the first ID, reprogramming the label with the electronic label information, and
when the first ID of the label does not match an ID of the electronic module, issuing, by the label, an alert for display on the label.

2. The method of claim 1, wherein the step of receiving the electronic label information is made via at least one of a wired connection and a wireless connection.

3. The method of claim 1, wherein the electronic label information further includes a wiring diagram of the industrial automation I/O module.

4. The method of claim 1, wherein the label comprises a display that renders images using e-ink.

5. The method of claim 4, wherein the rendered image comprises product technical support.

6. The method of claim 4, wherein the display is configured to render images in color.

7. An apparatus, comprising:
an industrial automation input/output (I/O) module operating in an industrial control system, the industrial automation I/O module having a plurality of data channels each having a respective type selected from analog input (AI), analog output (AO), discrete input (DI), or discrete output (DO); and
a label paired to the industrial automation I/O module to identify one or more of the plurality of data channels of the industrial automation I/O module, wherein the label is identified by a first ID;
wherein the industrial automation I/O module is configured to (a) receive a request that includes electronic label information for reprogramming the label, the request having a second ID, (b) transmit the electronic label information to the label wirelessly or across a wired connection, and (c) cause the electronic label information to be displayed at the label when the second ID matches the first ID, the label being configurable and capable of (i) displaying an image or text without any power required to maintain the image or text and (ii) issuing an alert to a user when the first ID of the label does not match an ID of the industrial automation I/O module to which the label is paired,
wherein the electronic label information includes configuration information representative of a configuration of the industrial automation I/O module.

8. The apparatus of claim 7, wherein the industrial automation I/O module receives the electronic label information via a wired connection.

9. The apparatus of claim 7 where the industrial automation I/O module receives the electronic label information via a wireless connection.

10. The apparatus of claim 7, wherein the label comprises a display that renders images using e-ink.

11. The method of claim 1, further comprising:
receiving updated electronic label information;
displaying the updated electronic label information at the label automatically without user intervention.

12. A method comprising:
providing in an industrial control system a universal input/output (I/O) module able to be configured to have any of the I/O types (i) analog input (AI), (ii) analog output (AO), (iii) discrete input (DI), (iv) discrete output (DO), wherein the universal I/O module includes a label identified by a first ID, and wherein the universal I/O module is an I/O module operating within the industrial control system;
replacing a failed I/O module with the universal I/O module within the industrial control system, the failed I/O module configured one of (i) an analog input (AI), (ii) an analog output (AO), (iii) a discrete input (DI), or (iv) a discrete output (DO), the universal I/O module assuming a configuration of the failed I/O module;
receiving, by the universal I/O module, electronic label information in a request, wherein the request has a second ID;
transmitting, by the universal I/O module, the electronic label information to the label wirelessly or across a wired connection;
automatically updating the label with the electronic label information to identify the universal I/O module when the second ID matches the first ID, the label being configurable and capable of (i) displaying an image or text without any power required to maintain the image or text and (ii) issuing an alert to a user when the first ID of the label does not match an ID of the universal I/O module to which the label is paired, wherein the electronic label information includes configuration information representative of the configuration of the failed module.

* * * * *